(12) United States Patent
Aoki

(10) Patent No.: US 6,216,669 B1
(45) Date of Patent: Apr. 17, 2001

(54) CONTROL SYSTEM FOR AN INTERNAL COMBUSTION ENGINE

(75) Inventor: Narutoshi Aoki, Numazu (JP)

(73) Assignee: Kokusan Denki Co., Ltd., Numazu (JP)

( * ) Notice: Subject to any disclaimer, the term of this patent is extended or adjusted under 35 U.S.C. 154(b) by 0 days.

(21) Appl. No.: 09/426,546

(22) Filed: Oct. 22, 1999

(30) Foreign Application Priority Data

Oct. 29, 1998 (JP) .................................................. 10-308522

(51) Int. Cl.[7] ................................. F02P 5/15; F02D 43/00
(52) U.S. Cl. ................................. 123/406.65; 123/406.52; 123/486; 701/115
(58) Field of Search ........................ 123/406.52, 406.55, 123/406.64, 406.65, 486; 701/102, 103, 115

(56) References Cited

U.S. PATENT DOCUMENTS

| | | | |
|---|---|---|---|
| 4,619,234 | * 10/1986 | Okamoto | 123/486 X |
| 4,732,125 | * 3/1988 | Takizawa | 123/406.19 |
| 4,737,914 | * 4/1988 | Abe et al. | 123/486 X |
| 5,422,811 | 6/1995 | Togai | 701/105 |
| 5,450,828 | 9/1995 | Sakamoto et al. | 123/339.11 |
| 5,573,474 | 11/1996 | Marsh et al. | 477/9.1 |
| 5,629,853 | 5/1997 | Ogawa et al. | 701/103 |

FOREIGN PATENT DOCUMENTS 2853300    11/1998   (JP) .

* cited by examiner

Primary Examiner—Tony M. Argenbright
(74) Attorney, Agent, or Firm—Pearne & Gordon LLP

(57) ABSTRACT

A control system for an internal combustion engine adapted to precisely control an ignition position of the internal combustion engine in accordance with a revolution of the engine detected from an output of a pick up coil generating a signal in synchronism with a rotation of a crank shaft and an opening degree of a throttle valve by use of a microcomputer. Whenever an output of a throttle sensor is sampled, a three-dimensional map providing a relation among the revolution of the engine, the opening degree of the throttle valve and the ignition position is transferred into a two-dimensional map providing a relation between the revolution of the engine and the ignition position whereby the ignition position is determined by the two-dimensional map as soon as the revolution of the engine is detected so that the ignition is operated when the determined ignition position is detected.

2 Claims, 12 Drawing Sheets

Fig. 4

| | | REVOLUTION N [rpm] | | | | | | | | | | | | | | | |
|---|---|---|---|---|---|---|---|---|---|---|---|---|---|---|---|---|---|
| | | N0 | N1 | N2 | N3 | N4 | N5 | N6 | N7 | N8 | N9 | N10 | N11 | N12 | N13 | N14 | N15 |
| | | 200 | 400 | 600 | 800 | 1000 | 1500 | 2000 | 2500 | 3000 | 3500 | 4000 | 4500 | 5000 | 5500 | 6000 | 6250 |
| OPENING DEGREE OF THROTTLE θ [deg] | θ0  5.0 | 5.0 | 3.0 | 0.0 | 0.0 | -1.0 | -2.0 | -2.0 | -2.0 | -2.0 | -2.0 | -2.0 | -2.0 | -2.0 | -2.0 | -2.0 | -2.0 |
| | θ1  7.5 | 3.0 | 1.0 | 2.0 | 2.0 | 3.0 | 2.0 | 1.0 | 1.0 | 1.0 | 1.0 | 1.0 | 1.0 | 1.0 | 1.0 | 1.0 | 1.0 |
| | θ2  10.0 | 3.0 | 2.0 | 4.0 | 4.0 | 5.0 | 4.0 | 3.0 | 3.0 | 3.0 | 3.0 | 3.0 | 3.0 | 3.0 | 3.0 | 3.0 | 3.0 |
| | θ3  12.5 | 3.0 | 5.0 | 7.0 | 6.0 | 7.0 | 6.0 | 5.0 | 5.0 | 5.0 | 6.0 | 6.0 | 6.0 | 6.0 | 6.0 | 6.0 | 6.0 |
| | θ4  15.0 | 3.0 | 8.0 | 10.0 | 8.0 | 8.0 | 8.0 | 8.0 | 9.0 | 9.0 | 10.0 | 10.0 | 10.0 | 10.0 | 10.0 | 10.0 | 10.0 |
| | θ5  20.0 | 3.0 | 11.0 | 13.0 | 11.0 | 12.0 | 12.0 | 12.0 | 12.0 | 12.0 | 12.0 | 12.0 | 12.0 | 12.0 | 12.0 | 12.0 | 12.0 |
| | θ6  25.0 | 3.0 | 12.0 | 14.0 | 14.0 | 15.0 | 15.0 | 16.0 | 16.0 | 16.0 | 16.0 | 16.0 | 15.0 | 15.0 | 15.0 | 14.0 | 14.0 |
| | θ7  30.0 | 3.0 | 13.0 | 15.0 | 15.0 | 16.0 | 17.0 | 17.0 | 16.0 | 16.0 | 16.0 | 16.0 | 16.0 | 16.0 | 16.0 | 16.0 | 16.0 |
| | θ8  35.0 | 3.0 | 15.0 | 17.0 | 17.0 | 18.0 | 17.0 | 17.0 | 17.0 | 18.0 | 17.0 | 17.0 | 17.0 | 17.0 | 18.0 | 18.0 | 18.0 |
| | θ9  40.0 | 3.0 | 18.0 | 20.0 | 18.0 | 20.0 | 20.0 | 20.0 | 20.0 | 20.0 | 18.0 | 20.0 | 20.0 | 20.0 | 20.0 | 20.0 | 20.0 |
| | θ10  45.0 | 3.0 | 20.0 | 22.0 | 20.0 | 22.0 | 20.0 | 21.0 | 21.0 | 20.0 | 20.0 | 20.0 | 21.0 | 21.0 | 21.0 | 21.0 | 21.0 |
| | θ11  50.0 | 3.0 | 22.0 | 24.0 | 22.0 | 22.0 | 21.0 | 21.0 | 21.0 | 21.0 | 21.0 | 21.0 | 21.0 | 21.0 | 22.0 | 22.0 | 22.0 |
| | θ12  55.0 | 3.0 | 22.0 | 24.0 | 22.0 | 22.0 | 22.0 | 22.0 | 22.0 | 22.0 | 21.0 | 21.0 | 21.0 | 22.0 | 22.0 | 23.0 | 23.0 |
| | θ13  60.0 | 3.0 | 22.0 | 24.0 | 24.0 | 23.0 | 23.0 | 23.0 | 23.0 | 23.0 | 22.0 | 22.0 | 23.0 | 23.0 | 23.0 | 23.0 | 24.0 |
| | θ14  70.0 | 3.0 | 22.0 | 24.0 | 24.0 | 24.0 | 24.0 | 24.0 | 23.0 | 23.0 | 22.0 | 22.0 | 23.0 | 23.0 | 24.0 | 24.0 | 24.0 |
| | θ15  80.0 | 3.0 | 22.0 | 24.0 | 24.0 | 24.0 | 24.0 | 23.0 | 23.0 | 23.0 | 22.0 | 22.0 | 23.0 | 23.0 | 24.0 | 24.0 | 24.0 |

UNIT ON TABLE: [BTDC]

Fig. 5

| ENGINE TEMPERATURE Te [°C] | T0 | T1 | T2 | T3 | T4 | T5 | T6 | T7 |
|---|---|---|---|---|---|---|---|---|
|  | -30 | -10 | 0 | 10 | 20 | 30 | 40 | 70 |
| CORRECTION ANGLE K [deg] | -3.0 | -2.0 | -2.0 | -2.0 | -1.0 | 0.0 | 0.0 | 0.0 |

Fig. 6

| REVOLUTION N [rpm] | N0 | N1 | N2 | N3 | N4 | N5 | N6 | N7 | N8 | N9 | N10 | N11 | N12 | N13 | N14 | N15 |
|---|---|---|---|---|---|---|---|---|---|---|---|---|---|---|---|---|
| | 200 | 400 | 600 | 800 | 1000 | 1500 | 2000 | 2500 | 3000 | 3500 | 4000 | 4500 | 5000 | 5500 | 6000 | 6250 |
| θ [deg] | 3.0 | 16.5 | 18.5 | 17.5 | 19.0 | 20.0 | 20.5 | 20.5 | 20.0 | 19.0 | 18.5 | 18.5 | 18.5 | 19.0 | 19.0 | 19.0 |
| 37.5 | | | | | | | | | | | | | | | | |

CONTROL SYSTEM FOR AN INTERNAL COMBUSTION ENGINE

TECHNICAL FIELD OF THE INVENTION

This invention pertains to a control system for an internal combustion engine in which affiliated instruments having such a controlled variable as changes in accordance with a phase at which a drive signal is given and/or a signal width of the drive signal are adapted to be controlled in accordance with control conditions such as a revolution of the engine, an opening degree of a throttle valve and so on.

BACKGROUND OF THE INVENTION

An internal combustion engine is provided with such affiliated instruments or systems as an ignition system, a fuel injection system and an exhaust valve to control an exhaust timing which have such a controlled variable as an operation period or an operation amount in accordance with a phase at which a drive signal is given and/or a signal width of the drive signal.

For instance, the ignition system comprises an ignition circuit to generate an igniting high voltage when the ignition signal or drive signal is applied thereto and ignition position control means to control an ignition position which corresponds to the period at which an ignition operation is made and which is indicated by a rotary angle position of a crank shaft. The ignition position control means serves to determine the ignition position relative to the revolution of the engine, the opening degree of the throttle valve and so on and to supply an ignition signal to the ignition circuit at the determined ignition position.

The fuel injection system comprises an injector such as an electromagnet type fuel injecting valve including an electromagnet and a valve driven by the electromagnet and serving to open the valve while the drive current is received to inject the fuel, injection instruction means to make an arithmetical operation of a fuel injection time (a period during which the fuel is injected) and the ignition start position (a time at which the fuel injection starts and which is indicated by the rotary angle position of the crank shaft) relative to the revolution of the engine and the opening degree of the throttle valve to generate an injection instruction signal of rectangular wave having a time width corresponding to the thus obtained fuel injection time at the thus obtained injection start time and an injector drive circuit to flow the drive current through the injector while the injection instruction signal is given. Since a pressure of the fuel applied to the injector is kept constant, the amount of fuel (the operation amount) injected from the injector is determined on the signal width of the injection instruction signal.

The exhaust valve is provided in an exhaust port of a two cycle internal combustion engine and has an opening degree (an operation amount) controlled in accordance with the revolution of the engine and the opening degree of the throttle valve.

A control system having a microcomputer used has been employed for controlling these affiliated instruments of the internal combustion engine.

A prior control system for the internal combustion engine such as one for the ignition system, for example is adapted to detect a revolution of the engine from the distance (period) at which a picking up coil generates a plurality of signals at a predetermined rotary angle position of the internal combustion engine and to make an arithmetical operation of the ignition position on the next rotation of the engine (the rotary angle position of the crank shaft when the engine is ignited) by using the detected revolution in a job done every constant time distance by a main routine of a program practiced by the microcomputer.

As a result, although the picking up coil detects the revolution of the engine whenever it generates the signal (every rotation of the crank shaft), the ignition operation is made in accordance with an ignition position data determined on the revolution of the engine detected before the present revolution of the engine is detected. This disadvantageously causes the ignition position to be delayed relative to a change in the revolution of the engine.

In the condition that the revolution of the engine is kept stable, such a delay in the control of the ignition position may be allowed, but when the engine is driven at a relatively lower speed or on a rapid acceleration or deceleration so that the change in the revolution of the engine is relatively larger, the delay in the control will adversely affect the operation of the engine so that the rotation of the engine gets unstable or a performance in the acceleration of the engine will decrease.

As the internal combustion engine is specifically of two cycle type, for example, irregular combustion occurs at the low speed and it provides a large variation in the rotation of the engine due to deviation of the ignition position from the appropriate one. Thus, it is desirable to precisely control the ignition position of the engine relative to the instantaneous revolution of the engine ever one cycle thereof when it is driven at the low speed.

In order to solve the aforementioned problems, it will be considered to make an arithmetical operation of the ignition position using a map for the arithmetic operation of the ignition position immediately after the revolution is detected in an interruption routine practiced when the picking up coil generates a signal.

However, if a three-dimensional map is used as the map for the arithmetical operation of the ignition position, then it will take much time to make the arithmetical operation of the ignition position relative to the control conditions such as the revolution, the opening degree of the throttle valve and so on. Thus, with the ignition position determined in the interruption routine practiced when the revolution of the engine is detected, the arithmetical operation of the ignition position will be not in time and therefor the engine will fail to make the ignition operation.

Although the disadvantages of the control system for the internal combustion engine have been explained about the ignition system therefor as the control object, the same problems will occurs with other affiliated instruments as the control objects such as the fuel injection system in which the injection start period and the injection time should be controlled, if they are controlled so as to make the arithmetical operation of an objective value of the controlled variable in the same manner.

SUMMARY OF THE INVENTION

Accordingly, it is a principal object of the invention to provide a control system for an internal combustion engine adapted to more precisely control a control object relative to an instant revolution of the engine by making an arithmetical operation of an objective value of controlled variable relative to an arithmetically operated revolution immediately after the revolution of the engine is detected by an output signal from a picking up coil.

In accordance with one aspect of the present invention, there is provided a control system for an internal combustion engine for providing a drive signal to a control object which is either of affiliated instruments of an internal combustion engine changing a controlled variable in accordance with at least one of a phase at which the drive signal is given and a signal width of the drive signal so that the controlled variable corresponds to an objective value, comprising map storage means to store a three-dimensional map for making an arithmetical operation of the controlled variable so constructed that there are integrated a value of revolution of the internal combustion engine, values of control conditions other than the revolution and the objective value of the controlled variable as map data defining a plurality of map points which provides a relationship among the values of revolution, other control conditions and the objective amount; revolution detector means to detect the revolution of the internal combustion engine; control condition detector means to detect the control conditions other than the revolution and map arithmetical operation means to make an arithmetical operation of the objective value corresponding to the revolution detected by the revolution detector means and at least one of the control conditions detected by the control condition detector means; the revolution detector means so constructed as to detect the revolution of the internal combustion engine in synchronism with a rotation of a crank shaft of the internal combustion engine; the map arithmetical operation means comprising control condition sampling means to sample the control condition detected by the control condition detector means with a constant sampling period, two-dimensional map production means so constructed as to make an arithmetical operation of the value of revolution of the internal combustion engine and the objective value of the controlled variable defining a plurality of map points which provides a relationship between the values of the revolution and the objective amount by using the three-dimensional map and integrate the arithmetically operated value of the revolution and the objective value of the controlled variable as map data and controlled variable objective value arithmetical operation means to make an arithmetical operation of the objective value of the controlled variable relative to the revolution detected when the revolution of the internal combustion engine is detected by using the two-dimensional map.

In the description, a step in which the revolution of the internal combustion engine is detected in synchronism with the rotation of the crank shaft of the internal combustion engine is not practiced by detecting the revolution without any relation to a rotary angle position of the crank shaft and a count number of the rotation thereof, but by detecting an instantaneous revolution of the engine at predetermined rotary angle position or positions or detecting an average revolution of the engine whenever the crank shaft rotates at the predetermined count number.

How the revolution of the engine is detected may be appropriately selected in accordance with the control object. As the control object should be precisely controlled with a high response in accordance with the instantaneous revolution of the engine, the revolution of the engine detected as close as possible to the ignition position may be preferably used for making the arithmetical operation of the ignition position.

To this end, the ignition position is preferably obtained by making the arithmetical operation thereof immediately after the revolution of the engine may be detected at the predetermined position every rotation of the crank shaft of the engine. In case that the ignition position is advanced in accordance with the revolution of the engine, the position where the revolution of the engine should be detected may be preferably shifted on the change in the ignition position so that the revolution of the engine may be detected as close as possible to the ignition position. Further, in case that the ignition position of the multi-cylinder internal combustion engine should be controlled, the revolution of the engine may be detected commonly with respect to all the cylinders. But, the ignition position of each of the cylinders may be obtained by making the arithmetical operation thereof immediately after the revolution of the engine may be detected with respect to the respective cylinders.

In order to detect the revolution of the engine, there may be mounted on the engine a signal generator which generates a pulse signal at the predetermined rotary angle position of the engine. In this case, the revolution of the engine may be conventionally detected (1) from a distance at which the pulse signals of the signal generator occur, (2) from a counted number of pulse signals generated per unit time by a signal generator device (a rotary encoder) which generates them whenever the crank shaft rotates at a fine angle, (3) from a time width of half wave of an AC voltage generated by a magnet generator provided on the engine in synchronism with the engine, (4) from a frequency of an output signal generated by a frequency generator which generates a signal of frequency proportional to the revolution of the engine, or (5) from other factors. In this invention, either of them may be used for detecting the revolution of the engine.

As aforementioned, according to the invention, whenever the control conditions other than the revolution of the engine for forming the three-dimensional maps are sampled, there is produced the two-dimensional map for making the arithmetical operation of the controlled variable which provides a relationship between the revolution of the engine and the objective value of the controlled variable under the sampled control conditions and the objective value of the controlled variable is determined by using the two-dimensional map for making the arithmetical operation thereof when the revolution of the engine is detected. This allows the arithmetical operation of the controlled variable relative to the revolution of the engine for shorter time. Thus, it will be noted that the controlled variable of the control object may be more precisely controlled relative to the instantaneous revolution of the engine by making the arithmetical operation of the objective value of the controlled variable relative to the revolution immediately after it is detected.

In the present invention, the map arithmetical operation means may preferably further comprise a map storage memory having first and second memory areas and map storage means to alternately store the two-dimensional map sequentially produced by the map production means in the first and second memory areas.

In this case, the controlled variable objective value arithmetical operation means preferably makes an arithmetical operation of the objective value of the controlled variable by using the latest two-dimensional map relative to the control condition sampled immediately before the revolution is detected among the two-dimensional maps for making the arithmetical operation of the controlled variable which maps are stored in the first and second memory areas of the map storage memory when the latest two-dimensional map is already completed, but by using the already completed two-dimensional map when the latest two-dimensional map is not still completed.

If the two-dimensional maps produced whenever the control condition is sampled are always stored in only one storage area of RAM, then the incomplete two-dimensional map will be used when the revolution of the engine is detected while the arithmetical operation is being made for producing the two-dimensional map. This incomplete two-dimensional map is one which has the data of map points partially kept as the previously produced map has or has the data missing. Thus, it will be noted that this will cause the control object to fail to be positively controlled.

On the other hand, with the two-dimensional map sequentially produced by the map production means alternately stored in the two storage areas and with the objective value of the controlled variable arithmetically operated by using the latest two-dimensional map as aforementioned, the aforementioned troubles will be prevented so that the control object can be positively controlled in a precise manner.

It should be understood that the two-dimensional maps sequentially produced by the map production means are not always required to be alternately stored in the two memory areas of the map storage memory for preventing the incomplete two-dimensional map from being used. Alternatively, a buffer memory may be provided for temporarily storing the two-dimensional map while it is being produced. The contents of the buffer memory may be transferred to the memory for the two-dimensional map after it is completed. In this case, it should be allowed to take additional time to transfer the contents of the buffer memory to the memory for the two-dimensional maps.

The revolution detector means used for the invention should be constructed so that the revolution is detected at the constant rotary angle position of the crank shaft every one rotation thereof. Such revolution detector means may comprise a signal generator provided on the internal combustion engine to generate a first pulse signal at a first specific rotary angle position of the crank shaft of the engine and generate a second pulse signal at a second rotary angle position delayed relative to the first rotary angle position and a revolution arithmetical operation unit to arithmetically operate the revolution of the engine from time distance in which the second pulse signal is generated after the first pulse signal is generated.

BRIEF DESCRIPTION OF THE DRAWING

The above and other objects and features of the invention will be apparent from the description of the embodiments of the invention taken along with reference to the accompanying drawings in which;

FIG. 4 illustrates an example of a three-dimensional map for making an arithmetical operation of a fundamental ignition position used for controlling the ignition system shown in FIGS. 1 and 2;

FIG. 5 illustrates an example of a map for making an arithmetical operation of a correction angle for an engine temperature/ignition position used for controlling the ignition system shown in FIGS. 1 and 2;

FIG. 6 illustrates an example of a two-dimensional map for making an arithmetical operation of a fundamental ignition position which is produced by the control system of the invention;

DETAILED DESCRIPTION OF EMBODIMENTS OF THE INVENTION

An embodiment of the invention will be illustrated and described with respect to an ignition system wherein an ignition position is controlled relative to a revolution of an internal combustion engine, an opening degree of a throttle valve and an engine temperature.

Figure 1:
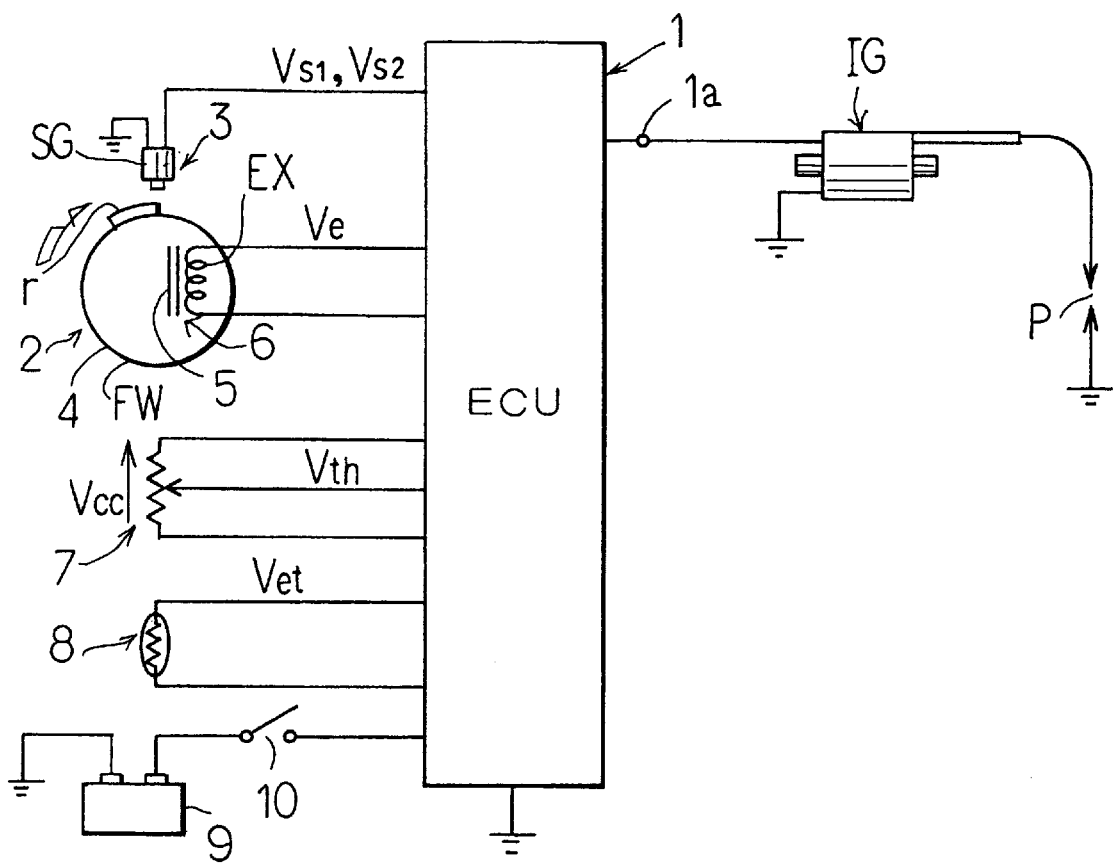
FIG. 1 is a block diagram of an ignition system as an example of a control system for an internal combustion engine constructed in accordance with an embodiment of the invention.
Figure 2:
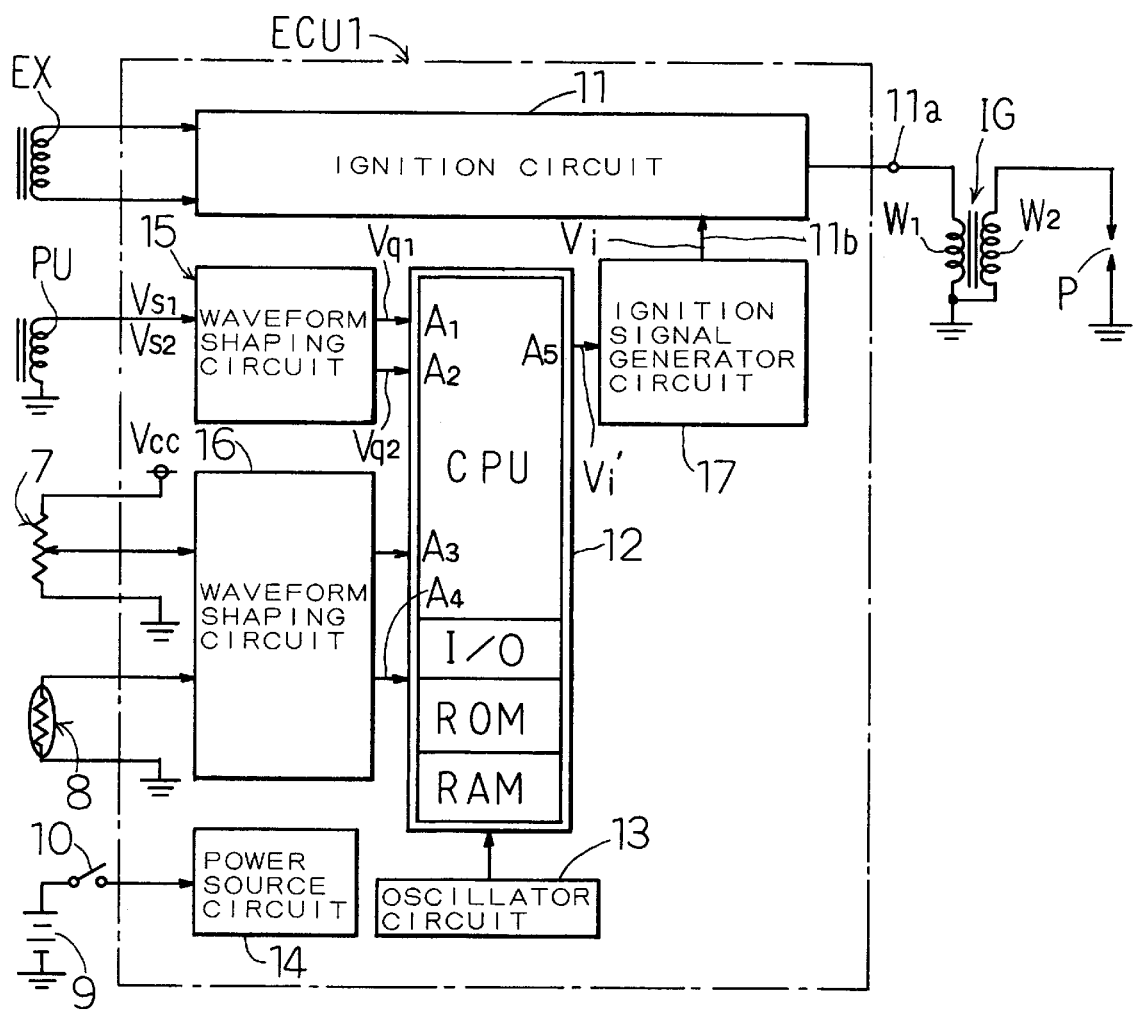
FIG. 2 is a block diagram of a further detailed construction of hardware of the ignition system of FIG. 1.
Figure 3:
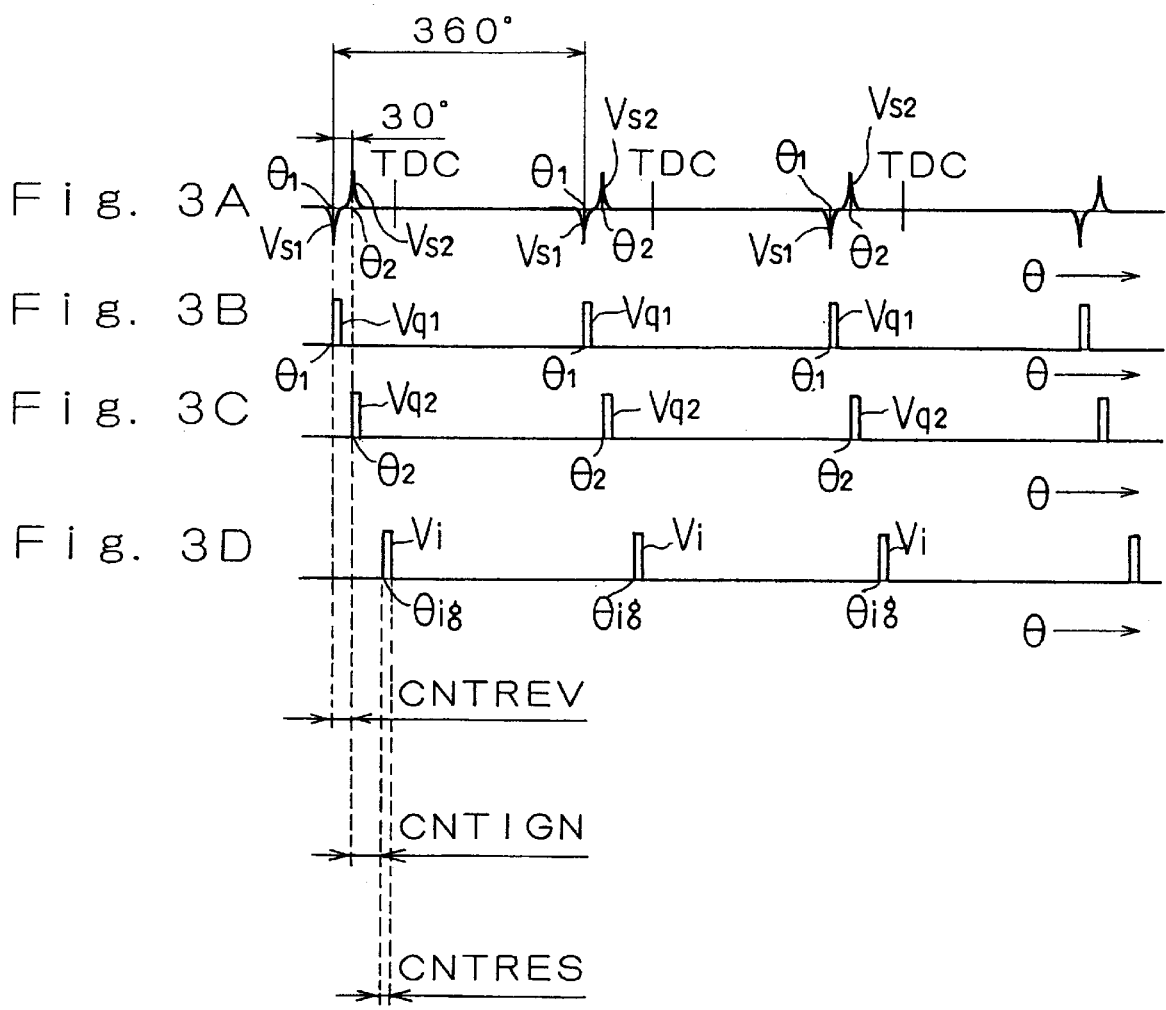
FIG. 3A illustrates waveforms of first and second signals generated by a signal generator for the ignition system shown in FIG. 2.
FIG. 3B illustrates a waveform of a first pulse signal obtained by shaping a first signal generated by the aforementioned signal generator.
FIG. 3C illustrates a waveform of a second pulse signal obtained by shaping a second signal generated by the aforementioned signal generator.
FIG. 3D illustrates an example of a waveform of an ignition signal which is supplied to an ignition circuit in the control system.

FIGS. 1 and 2 illustrate a construction of hardware of a control system a control object of which is the ignition system for the internal combustion engine and FIG. 3 illustrates waveforms of various components. The whole ignition system is shown in FIG. 1 while a further detailed interior construction is shown in FIG. 2.

In FIGS. 1 and 2 is illustrated an electronic control unit 1 for controlling affiliated instruments for the engine in accordance with various control conditions. The electronic control unit will be referred to as "ECU" which is an abbreviation thereof. The ECU 1 serves to control not only the ignition system, but also the other affiliated instruments such as a fuel injection system and so on. In the illustrated embodiment, ECU is illustrated to control only the ignition system.

To the ECU are supplied an AC output voltage Ve from an exciting coil EX provided in a magneto generator 2 which is in turn mounted on the internal combustion engine and pulse signals Vs1 and Vs2 generated by a signal generator SG provided on the magneto generator 3 which is in turn mounted on the internal combustion engine.

The magneto generator 2 may comprise a magneto rotor 4 formed by a permanent magnet mounted on a flywheel FW which is in turn provided on a crank shaft of the internal combustion engine and a stator 6 formed by the exciting coil EX and a generating coil (not shown) for charging a battery, both of which are wound on a core 5 having a magnetic pole faced to magnetic poles of the magneto rotor 4 to generate the AC output voltage Ve from the exciting coil EX in synchronism with rotation of the internal combustion engine.

In the illustrated embodiment, the signal generator 3 may comprise a reluctor (inductor) r formed by a salient portion provided on a periphery of the flywheel FW which forms the magneto rotor 4 and a signal generating unit SG disposed in a manner faced to the periphery of the flywheel.

The signal generating unit SG may conventionally comprise a core having a magnetic pole faced to the periphery of the flywheel, a picking up coil PU shown in FIG. 2 and wound on the core and a permanent magnet magnetically bonded to the core. The signal generator unit SG generates first and second signals Vs1 and Vs2 of pulse waveform which have different polarities induced by the picking up coil PU within the signal generating unit SG at a first rotary angle position where the reluctor r begins to be faced to the magnetic pole of the signal generating unit SG and at a second rotary angle where the reluctor r terminates to be faced to the magnetic pole of the signal generating unit SG because variation in magnetic flux within the core of the signal generating unit occurs. It will be noted that a rotary angle from the generation of the first signal Vs1 to the generation of the second signal Vs2 is equal to the pole arc angle of the reluctor r.

The position where the reluctor r begins to be faced to the magnetic pole of the signal generating unit SG is so set at a position fully advanced relative to the rotary angle position of the crank shaft corresponding to a top dead center of the engine. The set position corresponds to the maximum advanced ignition position or is further advanced relative thereto.

Waveforms of the first and second signals Vs1 and Vs2 generated by the picking up coil PU relative to the rotary angle θ of the crank shaft of the engine are as shown in FIG. 3A. In the illustrated embodiment, the first signal Vs1 of negative polarity is generated at the first rotary angle position θ1 which is set so as to be advanced by 75° relative to the rotary angle position of the crank shaft corresponding to the top dead center while and the second signal Vs2 of positive polarity is generated at the second rotary angle position θ2 which is set so as to be advanced by 45° degree relative to the rotary angle position of the crank shaft corresponding to the top dead center. The rotary angle position of the crank shaft corresponding to the top dead center will be referred to as "top dead center TDC" hereinlater.

To the ECU are also supplied an output Vth of a throttle sensor 7 for detecting an opening degree of a throttle valve which serves to adjust an intake amount of air for the engine and an output Vet of a temperature sensor 8 for detecting an engine temperature.

In the illustrated embodiment, the throttle sensor 7 may comprise a potentiometer which has a constant DC voltage Vcc applied thereto and has a slider connected to an operating shaft of the throttle valve to output the output signal Vth indicating the opening degree of the throttle valve and having a magnitude proportional to the opening degree of the throttle valve.

The temperature sensor 8 may comprise a temperature sensitive resistor element having a resistance value varying in accordance with the engine temperature such as a temperature of cooling water for the engine.

A power source voltage is applied to a power source terminal 9 of the ECU 1 through a switch 10 from a battery 9.

As shown in FIG. 2, in the ECU 1 is provided an ignition circuit 11 to which an output voltage of the exciting coil EX is applied as a power source voltage. The ignition circuit 11 has an output terminal 11a and a control terminal 11b and has a primary coil W1 of an ignition coil IG at one end connected to the output terminal 11a. The other end of the primary coil W1 is grounded to earth together with one end of a secondary coil W2 while the other end of the secondary coil W2 is connected to a non-grounded terminal of an ignition plug P provided in a cylinder of the engine.

The ignition circuit 11 serves to induce an igniting high voltage across the secondary coil W2 of the ignition coil IG by rapid variation in magnetic flux in the primary coil W1 of the ignition coil IG. In the illustrated embodiment, the ignition circuit may be of capacitor discharging type. The capacitor discharging type ignition circuit may conventionally comprise an igniting capacitor provided on the primary side of the ignition coil IG to be charged to one polarity by the output voltage of one half cycle of the exciting coil EX and a discharging switch which may be normally a thyristor, which serves to discharge the electric charge of the igniting capacitor through the primary coil W1 of the ignition coil. The igniting high voltage is induced across the secondary coil W2 of the ignition coil IG by discharging the electric charge of the igniting capacitor.

In order to generate the ignition signal Vi is provided a microcomputer 12 which includes CPU, an input/output interface (I/O), ROMs, RAMs, timers and so on. Clock pulses from an oscillator circuit 13 are supplied to the microcomputer 12. There is provided a power source circuit 14 to give the microcomputer a power source voltage. An output voltage of the battery 9 is applied through a switch 10 across the input terminals of the power source circuit 14. The power source circuit 14 serves to transfer the output voltage of the battery 9 into a constant voltage suitable for driving the microcomputer and apply the constant voltage to the microcomputer.

The microcomputer has input ports A1 through A4. To the input ports A1 and A2 are applied the first and second pulse signals Vq1 and Vq2 which are obtained by shaping waveforms of the first and second signals generated by the picking up coil PU by a waveform shaping circuit 15, respectively.

As shown in FIG. 3B, the first pulse signal Vq1 is generated when the first signal Vs1 is generated at the first rotary angle position θ1 or when the level of the first signal Vs1 reaches a threshold distinguished by the circuit while, as shown in FIG. 3C, the second pulse signal Vq2 is generated at when the second signal Vs2 is generated at the second rotary angle position θ2.

The microcomputer detects that the rotary angle position of the crank shaft of the engine corresponds to the first rotary angle position θ1 when the first pulse signal Vq1 is input and that the rotary angle position of the crank shaft corresponds to the second rotary angle position θ2 when the second pulse signal Vq2 is input.

In the illustrated embodiment, the first signal Vs1 is generated at the position advanced by 75° relative to the top dead center TDC while the second signal Vs2 is generated at the position advanced by 45° relative to the top dead center TDC. Thus, it will be noted that the angle from the first rotary angle position θ1 to the second rotary angle position θ2 is 30°.

To the input port A3 of the microcomputer 12 is input a throttle valve opening degree detecting signal which is obtained by shaping a waveform of the output signal of the throttle sensor 7 into a waveform which can be recognized by the microcomputer through a waveform shaping circuit 16. To the input port A4 is input an engine temperature detecting signal which is obtained by shaping a waveform of the output signal of the temperature sensor 8 through the waveform shaping circuit 16.

The microcomputer 12 reads from a revolution detecting timer a time (a counted value of clock pulses) when the rotary angle position of the crank shaft corresponds to the first rotary angle position θ1) and a time when the rotary angle position of the crank shaft corresponds to the second rotary angle position θ2, arithmetically operates a difference between the times to thereby detect as a revolution measurement time a time taken for the crank shaft to rotate by an angle distance from the first rotary angle position to the second rotary angle position which corresponds to an angle distance 30 degree equal to the pole arc angle of the relucter r, in the illustrated embodiment, and stores in RAM the result of the revolution of the engine which is obtained by being arithmetically operated from the revolution measurement time. The microcomputer samples the outputs of the sensors detecting the control conditions such as the opening degree of the throttle valve and so on every constant time and stores the values of the sampled control conditions in the a RAM. These are practiced by the microcomputer in accordance with the program stored in a ROM.

The microcomputer serves to arithmetically operate the ignition position relative to the thus obtained revolution and the sampled control conditions using a three-dimensional map providing a relation of the ignition position and to the operated revolution and another sampled control condition such as the opening degree of the throttle valve.

The ignition position defining the respective map points of the three-dimensional map is arithmetically operated in the form of a rotary angle measured on the advanced side from the rotary angle position of the crank shaft corresponding to the top dead center of the engine.

Thereafter, the time taken for the crank shaft to rotate from a standard position where the picking up coil PU generates a specific signal such as the second rotary angle position θ2 where it generates the second signal Vs2 to the ignition position is arithmetically operated as the ignition measurement time and the ignition signal controlling timer starts to count as it receives the ignition position measurement time obtained by being arithmetically operated when the second signal Vs2 is generated at the standard position. The ignition position measurement time is provided by the values of clock pulses to be counted for the crank shaft to rotate from the standard position to the ignition position.

The microcomputer 12 generates an ignition position detecting signal Vi' from an output port A5 when the ignition signal controlling timer terminates to count the ignition position measurement time to thereby detect the thus obtained ignition position and supplies the ignition signal detecting signal Vi' to the ignition signal output circuit 17. The ignition signal output circuit 17 supplies an ignition signal Vi as shown in FIG. 3D to a control terminal of the ignition circuit 11 when it receives the ignition position detecting signal Vi' whereby an ignition operation is made.

In FIGS. 3A through 3D, the first rotary angle position "θ1" is positioned at 75° advanced relative to the top dead center TDC of the engine while the second rotary angle position "θ2" is positioned at 45° advanced relative to the top dead center TDC. Also, in FIG. 3, "CNTREV" indicates a label name for the RAM in which the time taken for the crank shaft to rotate from the first rotary angle position to the second rotary angle position is stored, "CNTIGN" indicates a label name for the RAM in which the ignition position measurement time is stored and "CNTRES" indicates a label name for the RAM in which the signal width measurement value providing the signal width of the ignition signal Vi is stored.

In the illustrated embodiment, programs shown in FIGS. 9 through 13 are stored in the ROM and the microcomputer 12 practices these programs whereby it accomplishes revolution detector means to detect the revolution of the internal combustion engine in synchronism with the crank shaft thereof, control condition sampling means to sample the control conditions detected by control condition detector means at a constant sampling period, two-dimensional map production means so constructed as to make an arithmetical operation of the value of the revolution of the internal combustion engine and the objective value of the controlled variable defining a plurality of map points which provide a relationship between the values of the revolution and the objective value of the controlled variable under a control of the sampled control conditions by using the three-dimensional map whenever the control conditions are sampled and to integrate as map data the value of the revolution and the objective value of the controlled variable both of which are thus obtained by being arithmetically operated, and map storage memory having first and second memory areas, map storage means to alternately store the two-dimensional maps for arithmetical operation of the controlled variable sequentially produced by the two-dimensional map production means in the first and second memory areas and controlled variable objective value arithmetical operation means to make an arithmetical operation of the objective value of the controlled variable relative to the detected revolution when the revolution of the internal combustion engine is detected by using the two-dimensional map stored in the map storage memory.

Figure 9:
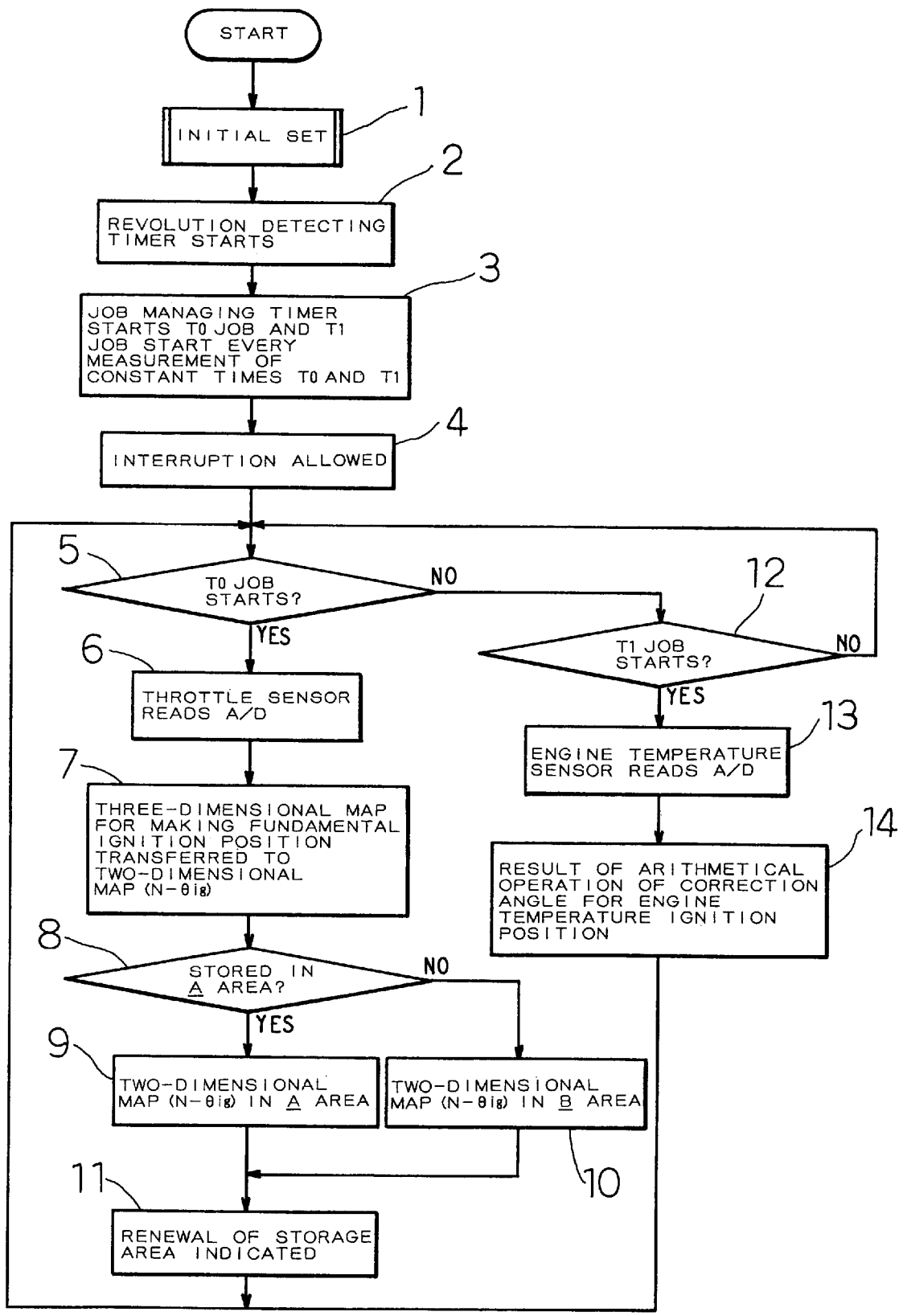
FIG. 9 is a flow chart showing an algorithm of a main routine practiced by a microcomputer in case that the ignition position is controlled by the control system of the invention.
Figure 10:
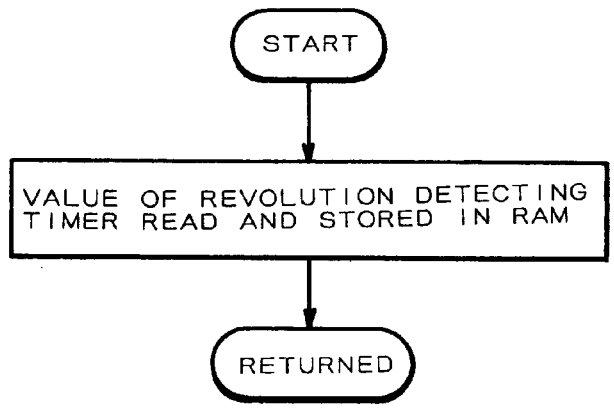
FIG. 10 is a flow chart showing an algorithm of an interruption routine practiced by the microcomputer when a picking up coil generates the first signal in case that the ignition position is controlled by the control system of the invention.
Figure 12:
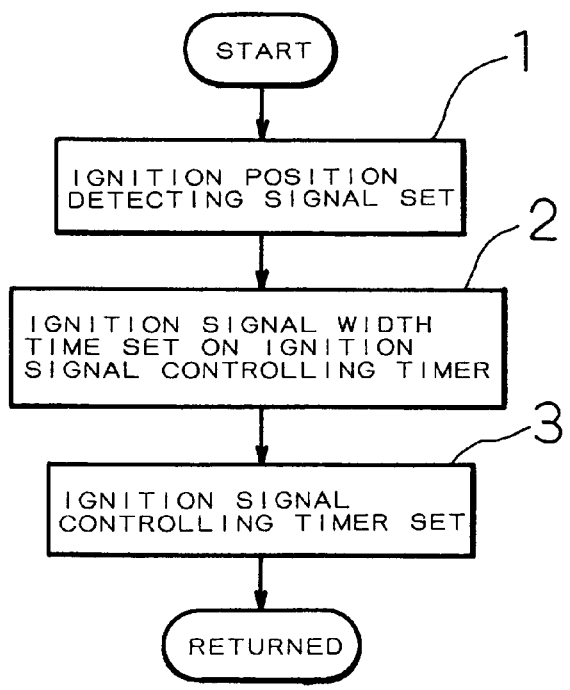
FIG. 12 is a flow chart showing an algorithm of an interruption routine practiced by the microcomputer when an ignition signal control timer terminates to measure an ignition position measurement time in case that the ignition position is controlled by the control system of the invention.
Figure 11:
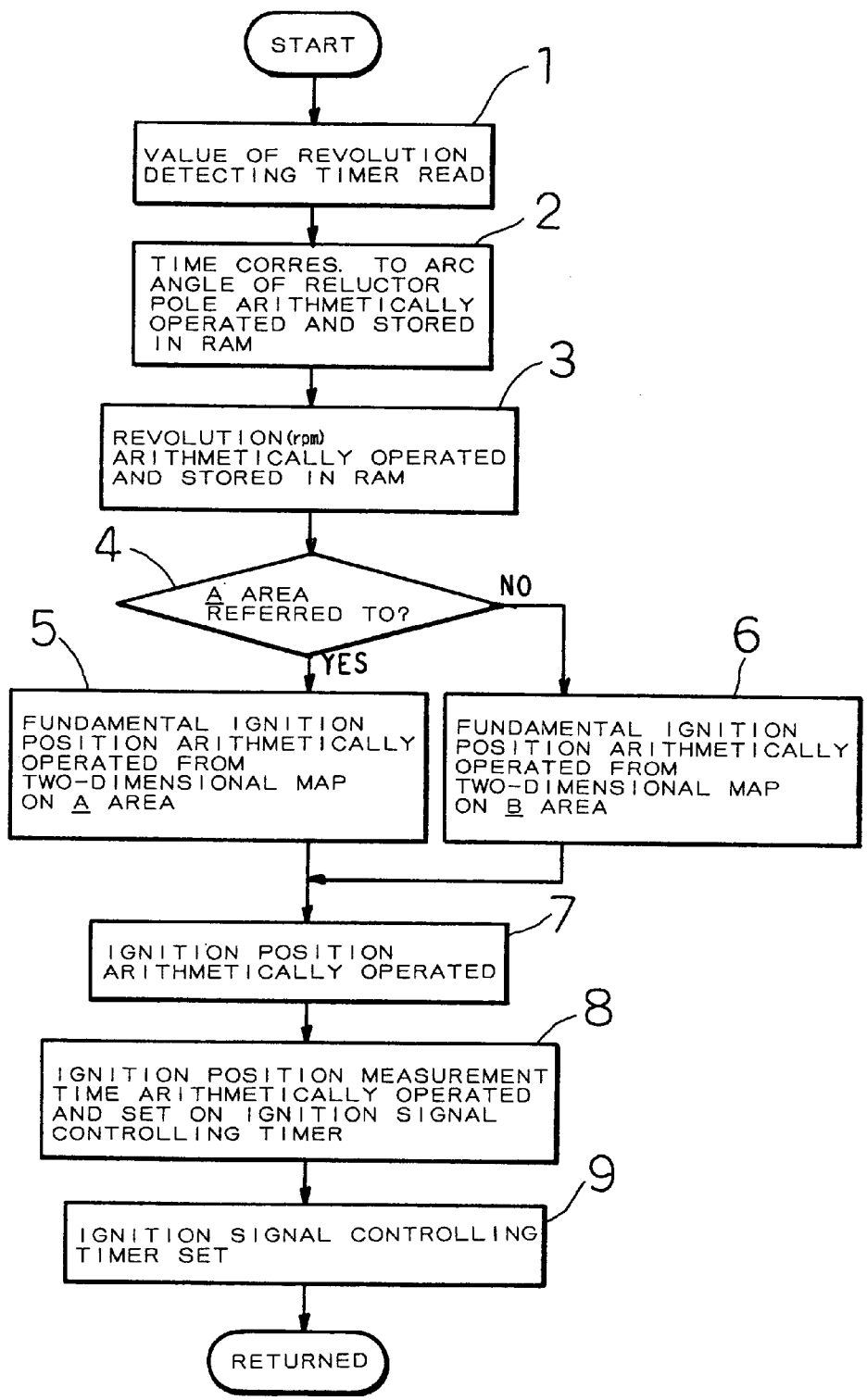
FIG. 11 is a flow chart showing an algorithm of an interruption routine practiced by the microcomputer when the picking up coil generates the second signal in case that the ignition position is controlled by the control system of the invention.
Figure 13:
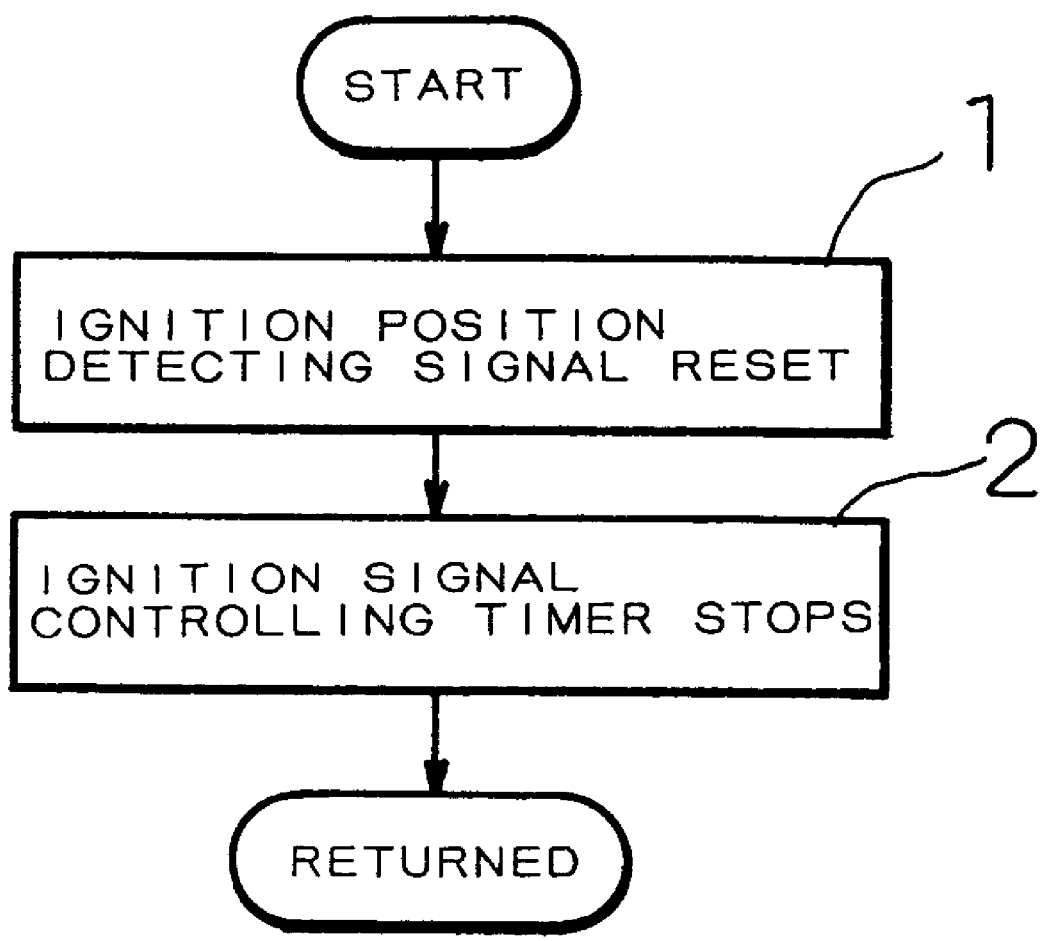
FIG. 13 is a flow chart showing an algorithm of an interruption routine practiced by the microcomputer when an ignition signal control timer terminates to measure an ignition pulse width time in case that the ignition position is controlled by the control system of the invention.

In the programs shown in FIGS. 9 through 13, the program of FIG. 9 shows a main routine while the program of FIG. 10 shows an interruption routine for starting to measure the revolution, which is practiced when a rising edge of the reluctor of the magneto generator is faced to the magnetic pole of the signal generator unit SG so that the picking up coil PU generates the first signal Vs1. The program of FIG. 11 shows an interruption routine for making an arithmetical operation of the revolution/ignition position, which is practiced when a setting edge of the reluctor of the magneto generator is faced to the magnetic pole of the signal generator unit SG so that the picking up coil PU generates the second signal Vs2. The program of FIG. 12 shows an interruption routine for generating an ignition signal, which is practiced when the ignition signal controlling timer terminates to count the values providing the ignition position. The program of FIG. 13 shows an interruption routine for resetting the ignition signal, which is practiced when the ignition signal controlling timer terminates to count the predetermined counting values.

In operation of the internal combustion engine control system of the invention, as the power source of the microcomputer 12 is established, various components are initially set as indicated by a step 1 of the main routine of FIG. 9 and thereafter the revolution detecting timer starts as indicated by a step 2 thereof. The timer may comprise a free-running counter which continuously counts clock pulses generated by the oscillator circuit 13. This timer serves to return the counted value to zero when it overflows and continues to count the value.

After the revolution detecting timer starts, a job managing timer starts to count until constant times T0 and T1 are counted as indicated by a step 3. T0 and T1 job start instructions are generated whenever the job managing timer measures the constant times T0 and T1, respectively.

After the job managing timer starts at the step 3, an interruption is allowed at a step 4 and whether T0 job starts or not is judged at a step 5. As a result, when the T0 job start instruction is generated, the program is advanced to a step 6 where a digital conversion value of the opening degree of the throttle valve which the throttle sensor 7 outputs is read. Thus, the detected value of the opening degree of the throttle valve which is one of the control conditions other than the revolution of the engine is sampled every the constant time T0.

After the detected value of the opening degree of the throttle valve is read, the value of the revolution of the internal combustion engine and the objective value of the controlled variable defining a plurality of map points which provide a relationship between the value of the revolution and the objective value of the controlled variable under a control of the sampled control conditions are arithmetically operated in an interpolated manner by using the controlled variable determining three-dimensional map to produce a two-dimensional map (N–θig) for making an arithmetical operation of the fundamental ignition position so constructed to integrate as map data the value of revolution and the objective value of the controlled variable which are obtained by making the arithmetical operation thereof.

Thus, it will be noted that whenever the control condition forming the three-dimensional map for making the arithmetical operation of the controlled variable is sampled, the three-dimensional map is converted into the two-dimensional map which provides the relation between the revolution and the objective value of the controlled variable under the sampled control condition.

Thereafter, in a step 8, whether the produced two-dimensional map should be stored in the first memory area (A area) of the map storage memory is judged. Although the two-dimensional map storage memory has the first memory area (A area) and the second memory area (B area) so that the two-dimensional map can be stored in either of the memory areas, these memory areas have a priority order so decided that the first produced two-dimensional map is stored in the first memory area and the sequentially produced two-dimensional maps are alternately stored in the second and first memory areas.

In the step 8, when the memory area in which the now produced two-dimensional map should be stored is judged to be the A area, the program is advanced to a step 9 where the two-dimensional map is stored in the n the A area. In the step 8, when the memory area in which the now produced two-dimensional map should be stored is judged not to be the A area, the program is advanced to a step 10 where the two-dimensional map is stored in the B area.

The two-dimensional maps are produced by sequentially interpolating the values defining a plurality of map points forming the two-dimensional maps, but it should be understood that they are stored in the A area or the B area so that the data forming the two-dimensional maps are transferred to the memory not after the two-dimensional maps are completed, but whenever the revolution and the control condition (the opening degree of the throttle valve in the illustrated embodiment) defining the respective map points of the two-dimensional maps are arithmetically operated, the thus operated values are stored in the A area or the B area.

The three-dimensional map for making the arithmetical operation of the controlled variable is so constructed that there are integrated the value of the revolution of the internal combustion engine, the values of control conditions such as the opening degree of the throttle valve other than the revolution and the objective value of the controlled variable as map date defining a plurality of map points which provide a relationship among the objective value of the ignition position as well as the values of the revolution and the other control conditions.

Figure 7:
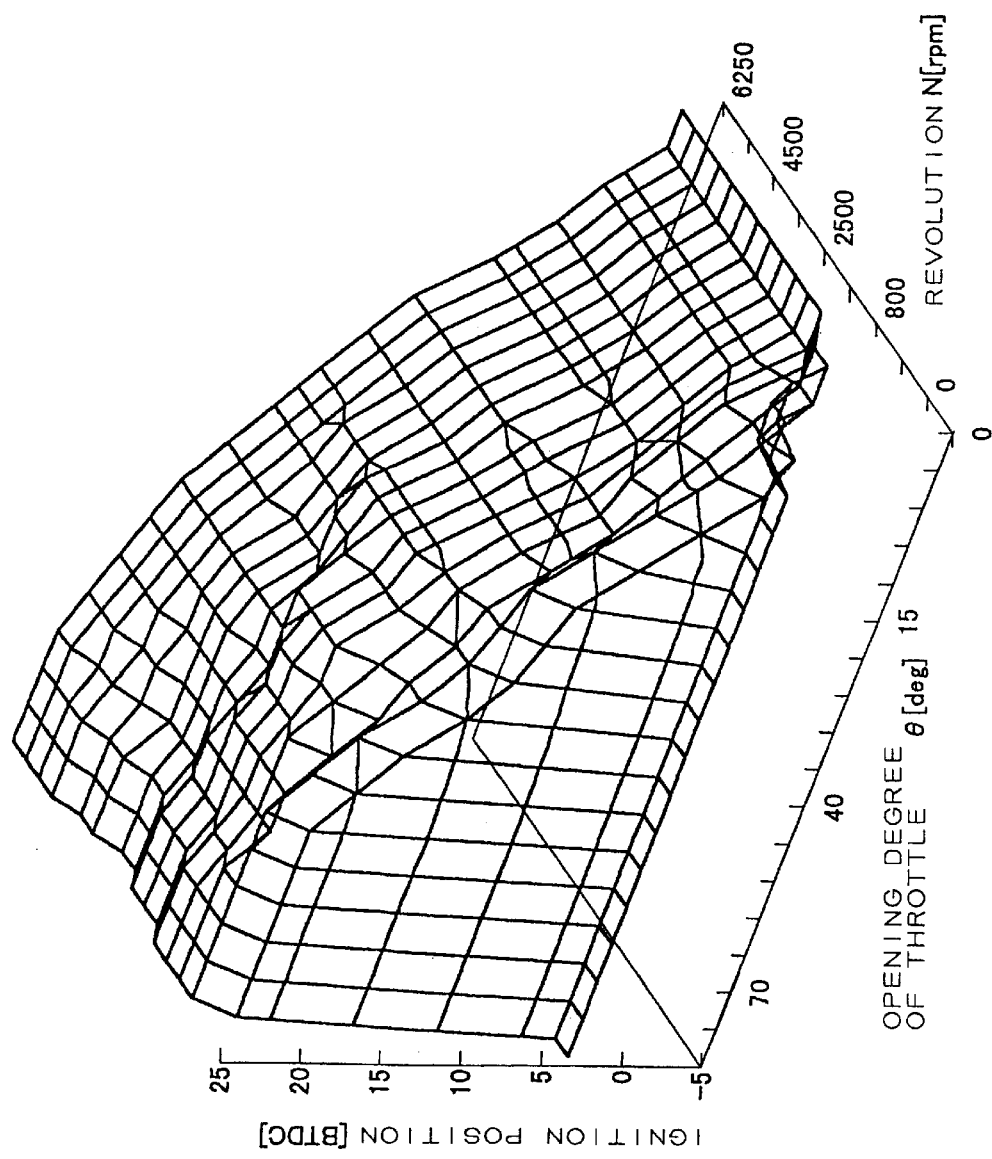
FIG. 7 illustrates the map of FIG. 4 using three-dimensional cartesian-coordinate.

For instance, the three-dimensional map may be as shown in Table of FIG. 4. In this figure, "θ0" through "θ15" designate the opening degree of the throttle valve which forms a scale of one horizontal axis of the three-dimensional map while N0 through N15 designate the revolution of the engine which forms another horizontal axis of the map. Values within frames where the frames for the opening degree of the throttle valve and the frames for the revolution cross designate the ignition positions in the map points defined by the respective throttle opening degree and the revolution. The values of 5.0, 3.0, - - - 24.0 designate angles measured on the advance side from the rotary angle position of the crank shaft corresponding to the top dead center TDC of the engine. The three-dimensional map are illustrated in a three-dimensional manner in FIG. 7.

Supposed that the three-dimensional map for making the arithmetical operation of the fundamental ignition position is as shown in FIG. 4 and that the opening degree of the throttle valve sampled at the step 6 is 37.5°, the two-dimensional map for making the arithmetical operation of the fundamental ignition position produced relative to the specific opening degree of the throttle valve is as shown in FIG. 6. The tow-dimensional map of FIG. 6 can be produced by reading the ignition positions corresponding to the revolutions N0 through N15 within the θ8 (35.0°) frame and the ignition positions corresponding to the revolutions N0 through N15 within the θ9 (40.0°) frame and arithmetically operating in the interpolated manner the ignition positions corresponding to the revolutions N0 through N15 read from the two frames.

Figure 8:
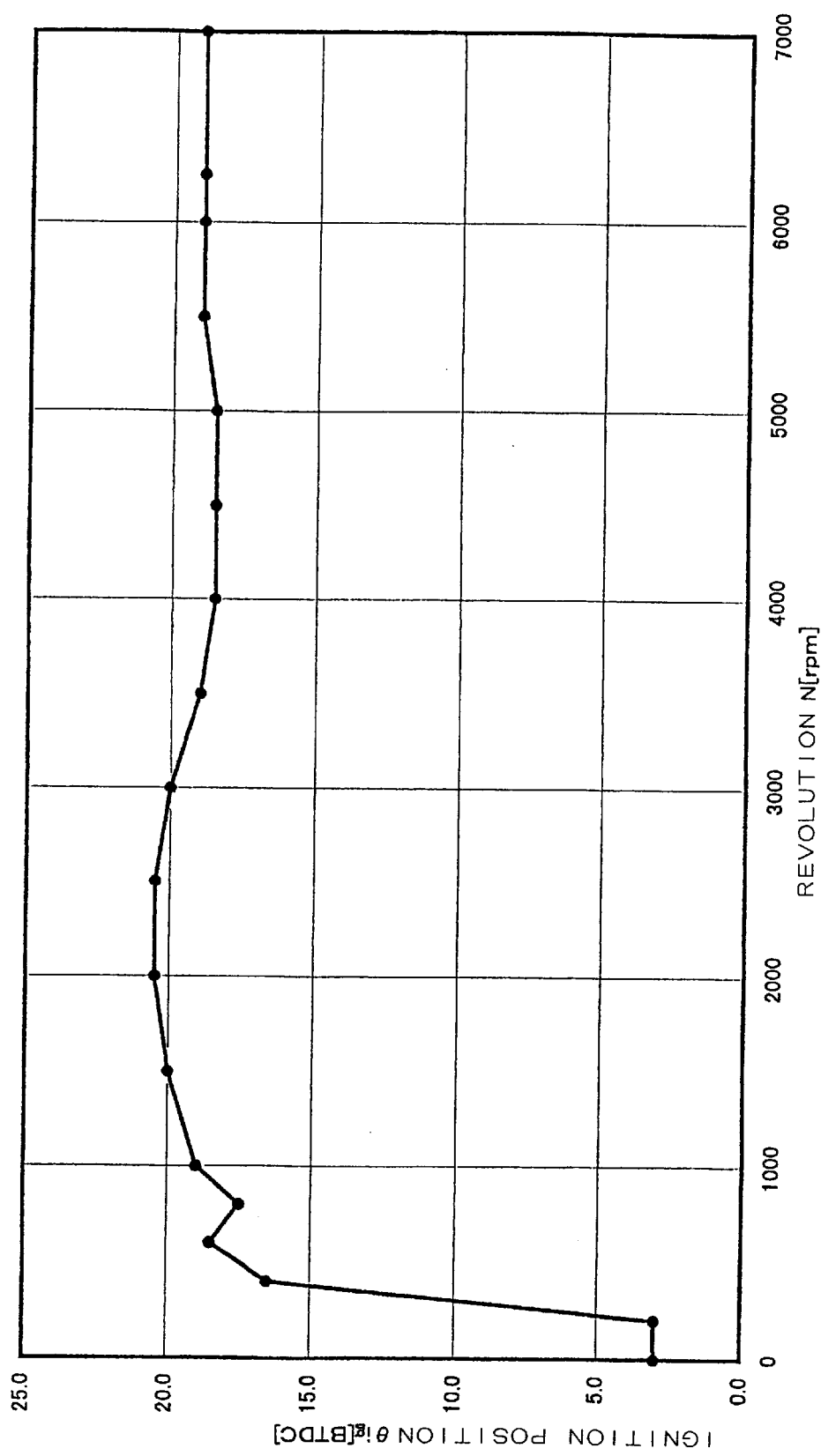
FIG. 8 is a diagram showing a relationship (fundamental ignition characteristics) between a revolution of the engine and a fundamental ignition position determined by the two-dimensional map shown in FIG. 6.

Fundamental ignition characteristic in case that the fundamental ignition positions relative to the respective revolutions are obtained by being arithmetically operated by using the two-dimensional map of FIG. 6 for arithmetical operation of the fundamental ignition position is as shown in FIG. 8.

After practicing the steps of storing the two-dimensional maps in the A area or the B area of the map storage memory, an indication or flag is renewed which indicates whether the complete latest two-dimensional map is stored in the A area or the B area. The indicated area corresponds to the memory area which should be referred to when the ignition position is to be arithmetically operated later.

When the T0 job is judged not to start at the step 5, a step 12 is practiced which judges whether the T1 job starts or not. When the T1 job is judged not to start, the program is returned to the step 5. When the T1 job is judged to start, a step 13 is practiced which reads the digital conversion value of the output of the engine temperature sensor 8 and a step 14 is practiced which a correction angle K for the engine temperature/ignition position is arithmetically operated by using a map of for making an arithmetical operation of the correction angle for the engine temperature/ignition position stored in the ROM. The thus operated correction angle K is stored in the RAM named "HEGIGN". The map for the correction angle is shown in FIG. 5.

The map for making the arithmetical operation of the correction angle for the engine temperature/ignition position shown in FIG. 5 may be formed of a table providing a relationship between the correction angle K for the engine temperature/ignition position and the engine temperature Te. The correction angle for the engine temperature/ignition position can be obtained by reading the value of the correction angle nearly close to the detected engine temperature from the table and arithmetically operating the read value of the correction angle in an interpolated manner. The ignition position having the engine temperature reflected may be obtained by adding the correction angle to the fundamental ignition position expressed by the angle of the crank. A reference code "–" (minus) which is attached to the correction angles indicates that the ignition position is corrected on the delayed side.

In the main routine of FIG. 9, the steps 3, 5 and 6 accomplish the control condition sampling means serving to sample the control conditions detected by the control condition detector means such as the throttle sensor 7 of FIG. 1, for example at a constant sampling period.

The steps 7 accomplishes the two-dimensional map production means which produces the two-dimensional map for the arithmetical operation of the controlled variable so constructed to integrate the value of the revolution and the objective value of the controlled variable which are obtained by arithmetically operating the value of the revolution and the objective value of the controlled variable defining a plurality of map points, respectively which provide the relation between the revolution and the objective value of the controlled variable under the sampled control condition whenever the control condition is sampled.

Furthermore, the steps 8 through 11 of FIG. 9 accomplish the map storage memory to alternately store the two-dimensional maps for making the arithmetical operation of the controlled variable sequentially produced by the map production means in the first and second memory areas of the map storage memory (RAM).

When the picking up coil PU generates the first signal Vs1, the main routine of FIG. 9 is interrupted and the interruption routine of FIG. 10 is practiced. In the interruption routine of FIG. 10, the counted value of the revolution detecting timer is read and stored in the RAM named "BASFRC", after which the program is returned to the main routine of FIG. 9.

When the picking up coil PU generates the second signal Vs2, the interruption routine of FIG. 11 is practiced. In this interruption routine, the counted value of the revolution detecting timer is read at a step 1 and the program is then advanced to a step 2 where a difference between the counted value of the revolution detecting timer read at this step 1 and the counted value of the revolution detecting timer read when the first signal Vs1 is generated and stored in the RAM named "BASFRC" is arithmetically operated to determine the time taken for the engine to rotate at the angle distance which is 30° in the illustrated embodiment and which corresponds to the pole arc angle of the reluctor r. The result of operation is stored in the RAM named "CNTREV". After that, at a step 3, the revolution (rpm) of the engine is arithmetically operated from the time corresponding to the pole arc angle stored in the RAM named "CNTREV" and the result of operation is stored the RAM named "REVDAT".

Thereafter, in a step 4 of FIG. 11, whether the memory area in which the two-dimensional map used for the arithmetical operation of the fundamental ignition position is stored is the A area or not is judged. When it is judged to be the A area, the fundamental ignition position relative to the revolution obtained by being arithmetically operated in the step 3 of FIG. 11 is arithmetically operated in an interpolated manner by using the two-dimensional map stored in the A area. When the memory area in which the two-dimensional map used for the arithmetical operation of the fundamental ignition position is stored is judged not to be the A area, the program is advanced to a step 6 where the fundamental ignition position relative to the revolution obtained by being arithmetically operated in the step 3 of FIG. 11 is arithmetically operated in an interpolated manner by using the two-dimensional map stored in the B area.

Thereafter, in a step 7 of FIG. 11, the correction angle K for the engine temperature/ignition position arithmetically operated in the step 14 of the main routine of FIG. 9 11 and stored in the ROM is added to the arithmetically operated fundamental ignition position so that the ignition position having the engine temperature reflected can be obtained.

Then, in a step 8 of FIG. 11, the ignition position measurement time taken for the engine to rotate from the standard position such as the position where the second signal Vs2 is generated as in the illustrated embodiment to the ignition position obtained arithmetically operated in the step 7 of FIG. 11 at the revolution arithmetically operated in the step 3 of FIG. 11 is arithmetically operated and then set in the ignition signal controlling timer. After that, in a step 9 of FIG. 11, the ignition signal controlling timer is so set that when the counted value of the ignition signal controlling timer corresponds to the ignition position measurement time, the ignition signal controlling timer generates the interruption signal so as to practice an interruption routine of FIG. 12 and the program is returned to the main routine of FIG. 9.

As the ignition signal controlling timer terminates to count the ignition position measurement time, the ignition signal controlling timer generates the interruption signal to practice the interruption routine of FIG. 12. In a step 1 of this interruption routine of FIG. 12, the microcomputer 12 generates the ignition position detecting signal Vi'. Then, in a step 2 of FIG. 12, the ignition signal width time determining the signal width of the ignition signal is set in the ignition signal controlling timer. After that, in a step 3 of FIG. 12, the ignition signal controlling timer is so set that when the counted value of the ignition signal controlling timer corresponds to the ignition signal width time, the ignition signal controlling timer generates the interruption signal so as to practice an interruption routine of FIG. 13 and the program is returned to the main routine of FIG. 9.

As the microcomputer generates the ignition position detecting signal Vi' in the step 1 of FIG. 12, the ignition signal output circuit 17 of FIG. 2 generates the ignition signal Vi whereby the ignition circuit 11 discharges the charge of the igniting capacitor through the primary coil of the ignition coil IG so as to induce the igniting high voltage in the secondary coil of the ignition coil IG, which ignites the cylinder.

As the ignition signal width time elapses after the ignition signal Vi is generated, the ignition signal controlling timer generates the interruption signal. As this interruption signal is generated, the interruption routine of FIG. 13 is practiced. In a step 1 of the interruption routine of FIG. 13, the ignition signal detecting signal is reset or extinguished and then in a step 2 of FIG. 13, the ignition signal controlling timer stops and the program is returned to the main routine of FIG. 9. As the ignition position detecting signal is extinguished in the step 1 of FIG. 13, the ignition signal output circuit 17 stops generating the ignition signal Vi. This causes the signal width of the ignition signal Vi to be limited to the minimum magnitude enough to trigger the discharging switch provided in the ignition circuit 11.

With the control system constructed as aforementioned, whenever the revolution of the engine is detected every one cycle, the map for arithmetically operating the ignition position is renewed, which enables the ignition operation to be made at the ignition position precisely corresponding to the detected revolution. Since the arithmetical operation of the ignition position relative to the revolution is made by using the two-dimensional map, it can be completed in a considerably shorter time. Thus, it will be noted that the arithmetical operation is never in time even though the ignition position is determined in the interruption routine for arithmetically operating the revolution.

Accordingly, even in such an internal combustion engine as of two cycle type one in which an irregular combustion tends to occur, the controlled variable such as the ignition position relative to the instantaneous revolution can be precisely controlled so that the engine can rotate in a stable manner. Even when the engine is rapidly accelerated, the controlled variable such as the ignition position can be controlled following variation in the revolution, which causes the engine to be driven in better manner.

Since there is produced the two-dimensional map for making the arithmetical operation of the controlled variable which provides a relationship between the revolution of the internal combustion engine and the objective value of the controlled variable under the control conditions other than the revolution forming the three-dimensional map whenever the control conditions are sampled whereby the objective value of the controlled variable relative to the revolution every detection thereof is arithmetically operated by using the two-dimensional map, the arithmetical operation of the objective value of the controlled variable can be made in a considerably shorter time. Thus, the objective value of the controlled variable can be determined immediately after the revolution is detected and the controlled variable of the control object can be precisely controlled relative to the instantaneous revolution.

Although some preferred embodiments have been described and illustrated with reference to the accompanying drawings, it will be understood by those skilled in the art that they are by way of examples and that the control object to which the control system of the invention can be applied is not limited to the ignition system, but to the fuel injection system or the controller for controlling the exhaust valve adjusting the exhaust timing of the two cycle engine. Thus, it should noted that various changes and modifications may be made without departing from the spirit and scope of the invention, which is defined only to the appended claims.

What is claimed is:

1. A control system for an internal combustion engine for providing a drive signal to a control object which is at least one of affiliated instruments of an internal combustion engine changing a controlled variable in accordance with at least one of a phase at which the drive signal is given and a signal width of the drive signal so that said controlled variable corresponds to an objective value, comprising map storage means to store a three-dimensional map for making an arithmetical operation of the controlled variable so constructed that there are integrated a value of revolution of said internal combustion engine, values of control conditions other than the revolution and the objective value of said controlled variable as map data defining a plurality of map points which provide a relationship among the values of revolution, other control conditions and the objective value; revolution detector means to detect the revolution of said internal combustion engine; control condition detector means to detect the control conditions other than the revolution and map arithmetical operation means to make an arithmetical operation of the objective value corresponding to the revolution detected by said revolution detector means and at least one of the control conditions detected by said control condition detector means; said revolution detector means so constructed as to detect the revolution of said internal combustion engine in synchronism with a rotation of a crank shaft of said internal combustion engine; said map arithmetical operation means comprising control condition sampling means to sample the control condition detected by said control condition detector means with a constant sampling period, two-dimensional map production means so constructed as to make an arithmetical operation of the value of revolution of said internal combustion engine and the objective value of the controlled variable defining a plurality of map points which provide a relationship between the values of the revolution and the objective amount by using said three-dimensional map and integrate as map data the arithmetically operated value of the revolution and the objective value of the controlled variable and controlled variable objective value arithmetical operation means to make an arithmetical operation of the objective value of the controlled variable relative to the revolution detected when the revolution of said internal combustion engine is detected by using said two-dimensional map.

2. A control system for an internal combustion engine for providing a drive signal to a control object which is at least one of affiliated instruments of an internal combustion engine changing a controlled variable in accordance with at least one of a phase at which the drive signal is given and a signal width of the drive signal so that said controlled variable corresponds to an objective value, comprising map storage means to store a three-dimensional map for making an arithmetical operation of the controlled variable so constructed that there are integrated a value of revolution of said internal combustion engine, values of control conditions other than the revolution and the objective value of said controlled variable as map data defining a plurality of map points which provide a relationship among the values of revolution, other control conditions and the objective value; revolution detector means to detect the revolution of said internal combustion engine; control condition detector means to detect the control conditions other than the revolution and map arithmetical operation means to make an arithmetical operation of the objective value corresponding to the revolution detected by said revolution detector means and at least one of the control conditions detected by said control condition detector means; said revolution detector means so constructed as to detect the revolution of said internal combustion engine in synchronism with a rotation of a crank shaft of said internal combustion engine; said map arithmetical operation means comprising control condition sampling means to sample the control condition detected by said control condition detector means with a constant sampling period, two-dimensional map production means so constructed as to make an arithmetical operation of the value of revolution of said internal combustion engine and the objective value of the controlled variable defining a plurality of map points which provide a relationship between the values of the revolution and the objective amount by using said three-dimensional map and integrate as map data the arithmetically operated value of the revolution and the objective value of the controlled variable, a map storage memory having first and second memory areas, map storage means to alternately store said two-dimensional map sequentially produced by said map production means in the first and second memory areas and controlled variable objective value arithmetical operation means to make an arithmetical operation of the objective value of the controlled variable relative to the revolution detected when the revolution of the internal combustion engine is detected by using the two-dimensional map, said map storage means so constructed to store map data of said two-dimensional map in a predetermined memory area of said memory whenever said two-dimensional production means arithmetically operates said map data and said controlled variable objective value arithmetical operation means so constructed as to make the arithmetical operation of the objective value of the controlled variable by using the latest two-dimensional map relative to the control conditions sampled immediately before the revolution is detected among the two-dimensional maps for making the arithmetical operation of the controlled variable which maps are stored in the first and second memory areas of the map storage memory when said latest two-dimensional map is already completed, but by using the already completed two-dimensional map when said latest two-dimensional map is not still completed.

* * * * *

UNITED STATES PATENT AND TRADEMARK OFFICE
CERTIFICATE OF CORRECTION

PATENT NO. : 6,216,669 B1
DATED : April 17, 2001
INVENTOR(S) : Narutoshi Aoki

Page 1 of 1

It is certified that error appears in the above-identified patent and that said Letters Patent is hereby corrected as shown below:

Column 2,
Line 50, delete "occurs" and insert -- occur --.

Column 7,
Lines 15, 28, 30, 36 and 37, delete "r" and insert -- $\underline{r}$ --.

Column 9,
Line 29, delete "r" and insert -- $\underline{r}$ --.

Column 11,
Lines 48, 50, 59, 60 and 63, delete "A" and insert -- $\underline{A}$ --.
Lines 50 and 64, delete "B" and insert -- $\underline{B}$ --.

Column 12,
Lines 1, 8, 56 and 58, delete "A" and insert -- $\underline{A}$ --.
Lines 1, 8, 56 and 59, delete "B" and insert -- $\underline{B}$ --.
Line 42, delete "tow" and insert -- two --.
Line 15, delete "date" and insert -- data --.

Column 13,
Lines 1 and 5, delete "K" and insert -- $\underline{K}$ --.
Line 65, delete "r" and insert -- $\underline{r}$ --.

Column 14,
Lines 8, 9, 12 and 15, delete "A" and insert -- $\underline{A}$ --.
Line 20, delete "B" and insert -- $\underline{B}$ --.
Line 21, delete "K" and insert -- $\underline{K}$ --.

Signed and Sealed this

Sixteenth Day of April, 2002

*Attest:*

*Attesting Officer*

JAMES E. ROGAN
*Director of the United States Patent and Trademark Office*